2,752,383
PRODUCTION OF FORMALDEHYDE CYANOHYDRIN

Salem F. Belt, Texas City, Tex., assignor to Monsanto Chemical Company, St. Louis, Mo., a corporation of Delaware No Drawing. Application October 19, 1953, Serial No. 387,029

8 Claims. (Cl. 260—465.6)

This invention relates to the production of formaldehyde cyanohydrin and, more particularly, to a novel, vapor-phase process whereby formaldehyde cyanohydrin is obtained from formaldehyde and hydrogen cyanide in the absence of a catalyst.

Prior art processes for the manufacture of formaldehyde cyanohydrin, for the most part, are liquid-phase processes which for optimum yields and efficiencies require the use of a catalyst as well as a solvent medium for the reaction. While such processes are generally satisfactory yieldwise, they cannot compare costwise with a vapor phase process utilizing the same raw materials but requiring no catalyst. Hence, the desirability of a low cost vapor-phase process for the commercial production of formaldehyde cyanohydrin is obvious. The only vapor-phase process known is a co-oxidation technique which is relatively complicated when compared with the straightforward, non-catalytic combination of formaldehyde and hydrogen cyanide.

It is an object of the invention, therefore, to provide an improved process for the production of formaldehyde cyanohydrin.

Another object is to provide a simple, efficient, non-catalytic, vapor-phase process for the production of formaldehyde cyanohydrin from formaldehyde and hydrogen cyanide.

Other objects and advantages of the invention will become apparent from the following description thereof.

According to the invention, formaldehyde cyanohydrin is produced in good yield by passing vapors of formaldehyde and hydrogen cyanide through a heated tube at moderately elevated temperatures in the range from 185–300° C.

The following example is presented to illustrate the invention but is not to be construed as limiting its scope in any manner.

Example 1

A glass tube 60 cm. long and 1 cm. in diameter was employed as a reactor. The tube was wrapped with nichrome heating wire, covered with insulation, and heated to a temperature of approximately 230° C. Vaporized hydrogen cyanide (65 cc. or 45.5 g.) and formaldehyde (40.1 g.) were mixed, preheated, and passed through the reaction tube at a space velocity under the reaction conditions of approximately 20 min.$^{-1}$, thus giving a residence time of 1.6 seconds. Tube temperature was maintained throughout the reaction period at approximately 250° C.

The product gas was passed into an ice-water cooled condenser and the condensate was collected in a flask. Uncondensed gases were vented through a water scrubber. Unreacted hydrogen cyanide and water were removed from the condensate by subjecting it to aspiration with water at a bottoms temperature of approximately 70° C. and a pressure of about 65 mm. The residue was then distilled under vacuum to recover 35.2 g. of a clear product with a refractive index of 1.4070$^{30°}$. (The refractive index of pure formaldehyde cyanohydrin is 1.4090$^{25°}$.) Infrared analysis of the product distillate established it to be formaldehyde cyanohydrin with only traces of hydrogen cyanide and formaldehyde as impurities. The yield based on formaldehyde vaporized approximated 50%.

The invention is, of course, not restricted to those conditions set forth in the example given. It will be obvious to one skilled in the art that substantial variations in reaction conditions may be made without departing from the scope of the invention. While, for example, tube temperatures in the range from 200–250° C. are preferred, the tube temperature may be maintained anywhere within the range from 185–300° C. Temperatures above 300° C. result in considerable decomposition and/or polymerization of the feed materials with a resulting deposition of carbon and/or tar which will interfere with proper operation of the equipment. Temperatures below 185° C. are impractical since the product cyanohydrin boils at about 183–185° C. At such low temperatures, condensation of formaldehyde cyanohydrin would occur in the reactor system and because of the unstable nature of this cyanohydrin, consequent difficulties in operation would arise.

Pressure is not a critical variable. While it is preferable to conduct the vapor-phase operation at atmospheric pressure, pressures above or below atmospheric may be employed at will without significantly affecting the reaction.

The relative mole proportions of formaldehyde and hydrogen cyanide employed may range from the 1:1 mol ratio required for the reaction to as high as 1:2. Optimum results are achieved by employing hydrogen cyanide in from 25 to 100% excess. Larger excesses of hydrogen cyanide serve no useful purpose and may cause difficulties arising from hydrogen cyanide polymerization.

Residence time in the reactor may vary from 1.15 seconds, with the shorter times, say from about 1 to about 5 seconds being preferred. Residence time in excess of 15 seconds provides opportunity for decomposition and/or polymerization of the feed materials.

The reactor or reactor tube may be fabricted from any of a number of materials commonly employed for similar reactions at moderately elevated temperatures. Suitable materials which may be mentioned are quartz, steel, stainless steel, nickel, and metal alloys such as that, for example, known to the trade as "Inconel."

Inert gases such as steam, nitrogen, carbon dioxide and the like may be employed as diluents in varying amounts, depending upon the reaction conditions employed.

What is claimed is:

1. A process for the production of formaldehyde cyanohydrin which comprises passing vapors of formaldehyde and hydrogen cyanide through a reaction tube heated to a temperature within the range from 185 to 300° C.

2. A process for the production of formaldehyde cyanohydrin which comprises passing vapors of formaldehyde and hydrogen cyanide through a reaction tube heated to a temperature within the range from 200–250° C.

3. A process for the production of formaldehyde cyanohydrin which comprises passing vapors of formaldehyde and hydrogen cyanide through a reaction tube heated to a temperature within the range from 185–300° C. at a space velocity such that residence time within the reactor is from about 1 to about 15 seconds.

4. A process for the production of formaldehyde cyanohydrin which comprises passing vapors of formaldehyde and hydrogen cyanide through a reaction tube heated to a temperature within the range from 185–300°

C. at a space velocity such that residence time within the reactor is from about 1 to about 5 seconds.

5. A process for the production of formaldehyde cyanohydrin which comprises passing vapors of formaldehyde and hydrogen cyanide through a reaction tube heated to a temperature within the range from about 200–250° C. at a space velocity such that residence time within the reactor is from about 1 to about 5 seconds.

6. The process of claim 1 in which the mole ratio of formaldehyde to hydrogen cyanide is within the range from 1:1 to 1:2.

7. The process of claim 3 in which the mole ratio of formaldehyde to hydrogen cyanide is within the range from 1:1 to 1:2.

8. The process of claim 5 in which the mole ratio of formaldehyde to hydrogen cyanide is 1:2.

References Cited in the file of this patent

UNITED STATES PATENTS 2,101,823    Dittmar _____ Dec. 7, 1937